United States Patent
Ni et al.

(10) Patent No.: US 9,659,009 B2
(45) Date of Patent: May 23, 2017

(54) SELECTIVE MACHINE TRANSLATION WITH CROWDSOURCING

(71) Applicant: International Business Machines Corporation, Armonk, NY (US)

(72) Inventors: Jian Ni, Ossining, NY (US); Andrzej Sakrajda, Briarcliff Manor, NY (US); Hui Wan, White Plains, NY (US); Cheng Wu, Mount Kisco, NY (US); Sasha P. Caskey, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 14/495,401

(22) Filed: Sep. 24, 2014

(65) Prior Publication Data

US 2016/0085746 A1    Mar. 24, 2016

(51) Int. Cl.
*G06F 17/28* (2006.01)

(52) U.S. Cl.
CPC ........ *G06F 17/289* (2013.01); *G06F 17/2845* (2013.01)

(58) Field of Classification Search
CPC .. G06F 17/28; G06F 17/2809; G06F 17/2818; G06F 17/2827; G06F 17/2836; G06F 17/2845; G06F 17/2854; G06F 17/2863; G06F 17/2872; G06F 17/289; G06F 17/2881
USPC .......................................................... 704/2–8
See application file for complete search history.

(56) References Cited

U.S. PATENT DOCUMENTS

| | | | |
|---|---|---|---|
| 5,381,346 A * | 1/1995 | Monahan-Mitchell | H04B 1/38 455/418 |
| 6,782,356 B1 * | 8/2004 | Lopke | G06F 17/2775 704/5 |
| 8,290,206 B1 | 10/2012 | Meyers | |
| 2010/0293026 A1 | 11/2010 | Vojnovic et al. | |
| 2011/0082684 A1 | 4/2011 | Soricut et al. | |
| 2011/0246881 A1 * | 10/2011 | Kushman | G06F 9/4446 715/708 |
| 2012/0141959 A1 | 6/2012 | Von Ahn Arellano et al. | |
| 2012/0197999 A1 * | 8/2012 | Agarwal | G06F 17/30755 709/205 |
| 2012/0221319 A1 * | 8/2012 | Trese | G06F 17/28 704/2 |
| 2012/0296635 A1 | 11/2012 | Brockett et al. | |
| 2013/0124185 A1 * | 5/2013 | Sarr | G06F 17/289 704/2 |
| 2013/0145283 A1 * | 6/2013 | Lee | H04L 51/00 715/752 |

(Continued)

OTHER PUBLICATIONS

Curran et al.; Ttl: The management of crowdsourcing in business processes; Conf. Ttl: 2009 IFIP/IEEE International Symposium on Integrated Network Management—Workshops (IM); 2009; Publisher: IEEE, Piscataway, NJ; Country of Publication: USA; ISBN: 978-1-4244-3923-2; Database: INSPEC.

*Primary Examiner* — Lamont Spooner
(74) *Attorney, Agent, or Firm* — Alexa L. Ashworth, Esq.; McGinn IP Law Group, PLLC

(57) ABSTRACT

A structure and method for crowdsourcing includes evaluating a metric related to a content to be translated, determining a priority for the content based on the metric related to the content, and queuing the content for crowdsourcing based on the priority determined from the metric.

20 Claims, 4 Drawing Sheets

(56) References Cited

U.S. PATENT DOCUMENTS

| | | | | |
|---|---|---|---|---|
| 2014/0006004 A1* | 1/2014 | Gundepuneni | ..... | G06F 17/2264 |
| | | | | 704/2 |
| 2014/0032596 A1* | 1/2014 | Fish | ................. | G06F 17/30867 |
| | | | | 707/770 |
| 2014/0039870 A1* | 2/2014 | Roy | ................... | G06F 17/2854 |
| | | | | 704/2 |
| 2014/0058718 A1* | 2/2014 | Kunchukuttan | .... | G06F 17/2836 |
| | | | | 704/2 |
| 2014/0081617 A1* | 3/2014 | Carter | .................... | G10L 15/32 |
| | | | | 704/2 |
| 2014/0188787 A1* | 7/2014 | Balamurugan | .... | G06Q 30/0629 |
| | | | | 707/609 |
| 2014/0195218 A1* | 7/2014 | Takaoka | ................ | G06F 17/289 |
| | | | | 704/2 |
| 2014/0303956 A1* | 10/2014 | Wilson | ................... | G06Q 10/06 |
| | | | | 704/2 |
| 2014/0325407 A1* | 10/2014 | Morris | ............... | G06F 3/04842 |
| | | | | 715/765 |
| 2014/0372098 A1* | 12/2014 | Arseniev | .............. | G06F 17/289 |
| | | | | 704/2 |
| 2015/0228035 A1* | 8/2015 | Williams, III | ......... | G06Q 50/01 |
| | | | | 705/2 |
| 2015/0242447 A1* | 8/2015 | Ipeirotis | ............ | G06F 17/30303 |
| | | | | 705/14.45 |
| 2015/0378989 A1* | 12/2015 | Wu | ...................... | G06F 9/4448 |
| | | | | 704/3 |

* cited by examiner

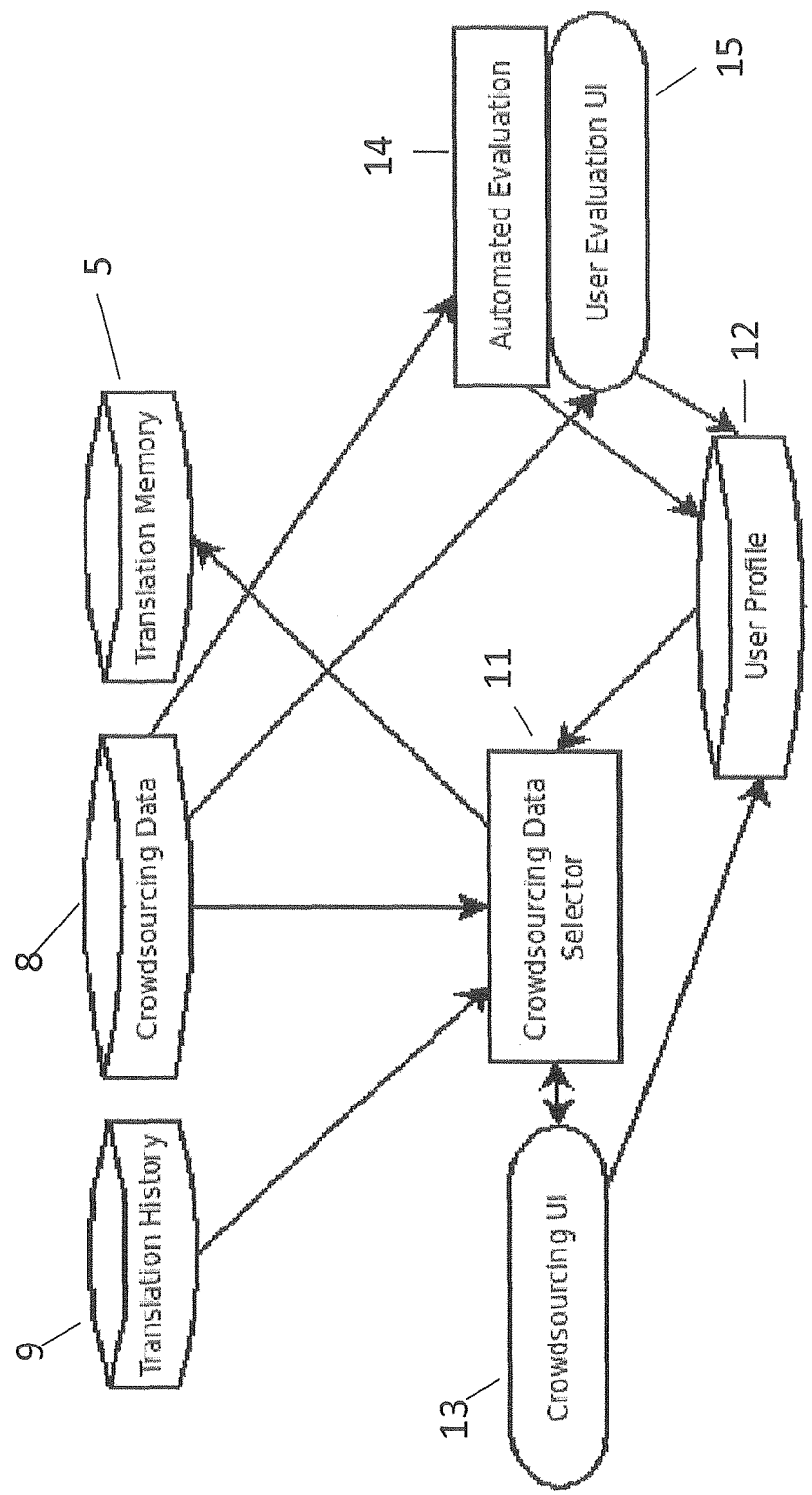

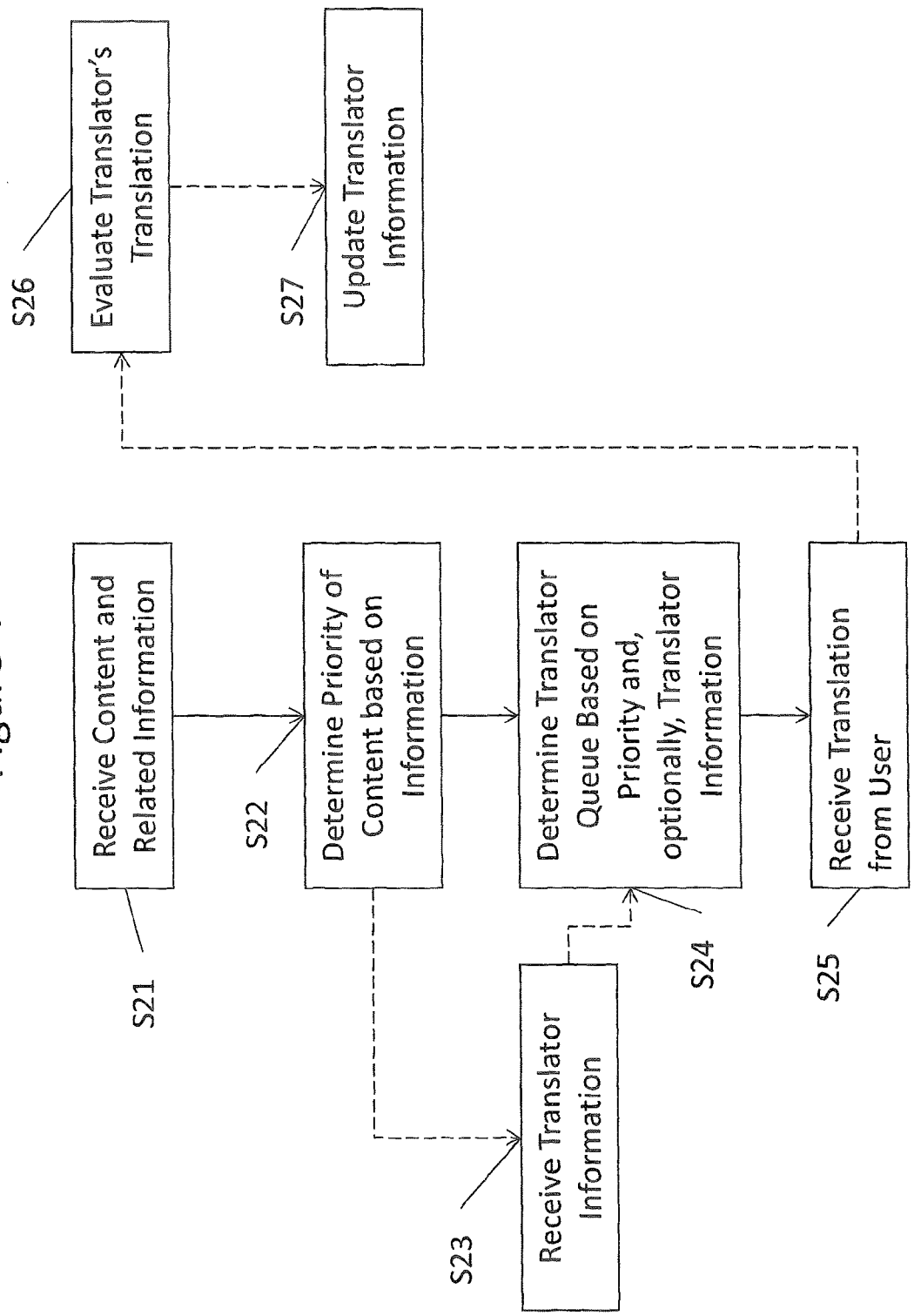

SELECTIVE MACHINE TRANSLATION WITH CROWDSOURCING

FIELD OF THE INVENTION

The present invention generally relates to a method and system for prioritizing content for crowdsourcing. In particular, the invention relates to content to be translated by crowdsourcing.

BACKGROUND OF THE INVENTION

Description of the Related Art

The translation of content (web pages, formatted documents, text files, etc.) includes steps of preprocessing such as extraction of text, segmentation, which produces collection of text segments in the source language; translation such as the extracted segments are passed to either human translators or to a Machine Translation (MT) server; and aggregation such as the translated segments are aggregated to create a final translated content.

A Translation Memory (TM), a collection of text segments in the source language with corresponding human translation of the segments in the target language, is frequently used to reduce the cost of translation. The segments passed to a human translator may be accompanied by MT result to assist in the translation task (presumably correcting existing translation is less costly than creating a new one from scratch). Due to the high cost of human translation, crowdsourcing has been used to replace professional translation services.

SUMMARY OF THE INVENTION

The unsupervised nature of crowdsourcing may require additional review steps implemented through either a voting system in crowdsourcing or a designated trusted human service. These techniques may be adequate to deal with a static content where the inherent latency of obtaining translated content of good quality is of no concern.

However, a lot of content data, especially in the web context, is very dynamic and ephemeric. That is, latency is not acceptable and has to be minimized. However, the crowdsourcing resources are limited due to specialized skills required from the participants (e.g., fluent in at least two languages).

In view of the foregoing, and other, exemplary problems, drawbacks, and disadvantages of the conventional systems, it is an exemplary aspect of the present invention to provide a system and method capable of prioritizing content for crowdsourcing.

In a first exemplary aspect of the invention, to achieve the above and other features and purposes, described herein is a method of crowdsourcing which includes evaluating a metric related to a content to be translated, determining a priority for the content based on metrics related to the content, and queuing the content for crowdsourcing based on the priority determined from the metrics.

Another exemplary aspect of the invention is a non-transitory computer-readable medium tangibly embodying a program of machine-readable instructions executable by an apparatus to perform a method of crowdsourcing which includes evaluating a metric related to a content to be translated, determining a priority for the content based on metrics related to the content, and queuing the content for crowdsourcing based on the priority determined from the metrics.

Another exemplary aspect of the invention is a translation system including a translation unit which is configured to receive content to be translated, the translation unit configured so as to track a metric related to the content to be translated, and a crowdsourcing unit configured to receive the content to be translated from the translation unit and queue the content to be translated based on the metric.

The above aspects may allow the prioritizing of content for crowdsourcing.

BRIEF DESCRIPTION OF THE DRAWINGS

The foregoing and other purposes, aspects and advantages will be better understood from the following detailed description of exemplary embodiments of the invention with reference to the drawings, in which:

FIG. 3 illustrates an exemplary embodiment of a crowdsourcing system according to the present invention; and FIG. 4 illustrates an exemplary method for crowdsourcing;

DETAILED DESCRIPTION OF EXEMPLARY EMBODIMENTS OF THE INVENTION

Figure 1:
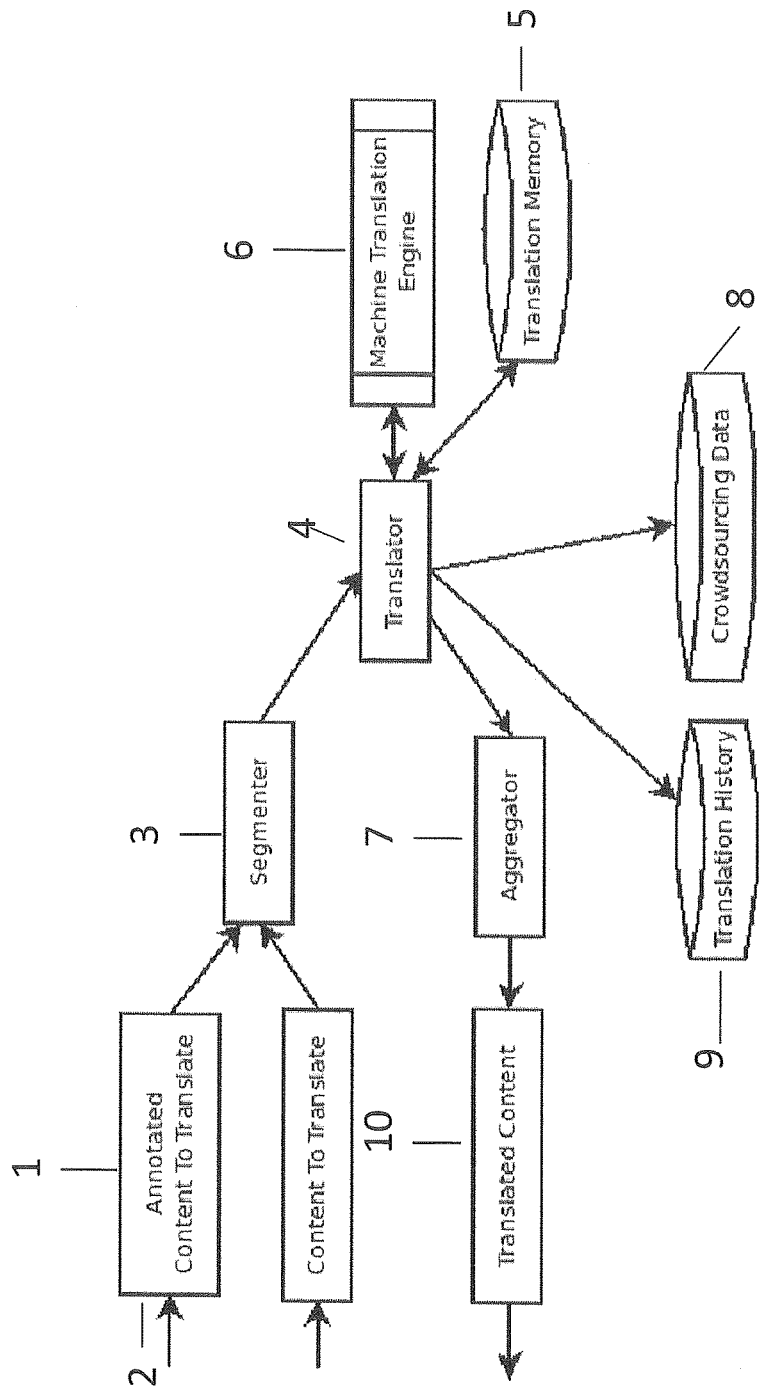
FIG. 1 illustrates an exemplary embodiment of a translation system according to the present invention.

Referring now to the drawings, and more particularly to FIGS. 1-4, there are shown exemplary embodiments of the method and structures according to the present invention.

An aspect of the invention can prioritize segments to be crowdsourced based on impact they will have on the perception of quality of the translated content. Prioritization may start in the content creation stage where the author should be able to indicate the criticality of different parts of the generated content. For example, legal notices have to be not only translated but reviewed for compliance with the laws in the geographies were they are published, essential warnings and alerts have to be legible and unambiguous after translation, navigational information (table of contents, menus in web pages, etc.) should have high level of accuracy after translation as mistakes in this area may hide completely underlying content.

The newly created content is submitted to the translation service and the data to be crowdsouced combined with the expected quality of service gets deposited in the crowdsourcing queue. The source language content is published and the end user is offered an option of translating it into target languages. Once the end user accesses the translation service, the content is segmented and the translated segments used to construct a final view are pulled from TMs and MT engines.

The segments which are translated by MT can be published for crowdsourcing. When a crowdsourcing participant accesses the system to perform some translation, the segments presented to the participant are selected based on the data gathered from the content creation phase and during operation of the translation service. If the MT engines offer reliable scoring of the result, then scores can be used as well to calculate effective priority (e.g., low scores get higher priority).

The priorities assigned in the initial publication of content may be adjusted if the content is not accessed for translation. If a user profile defining preferences and proficiencies is available, then it can be included in the process of selection of the content to be crowdsourced. For example, legal notices may be reserved for users indicating familiarity with the legal domain. The segments considered to be the most critical are pushed to the front of the queue. The crowdsourcing result is handled based on the metadata associated with the segment such that the critical segments are queued higher for review. The translations may be published in the TM so a subsequent request for translation will pick the human translation result.

An exemplary embodiment of the invention gathers the information for each segment such as frequency of translation requests, their timestamps, and the target language. In practice, there are a high percentage of sentences which repeat over and over. These repeating sentences can change over time depending on the popularity of the documents or subject matter. Using this kind of information, crowdsourcing may be made more efficient by increasing the priority for the sentences which will have the greatest impact on the quality of translations.

The weights attached to particular sentences to determine crowdsourcing priority can be constantly updated based on current need. For instance, the system may count the number of times a sentence is submitted for translation in a time period. Optionally, a weight may be applied to the sentence relating to one or more other parameters such as the language, any special area of expertise needed by the translator (e.g., legal), time in queue, flagged during submission, or other factors. The score for the sentence may also be reset (e.g., to zero or by dropping old data which is outside the collection window) after a predetermined period of time (e.g., two weeks) or some other condition. For example, if after two weeks the system has generated enough requests for appropriate ranking, then the sentence score may be reset on a two-week interval. This constant monitoring of the requests for translation can allow the information scored for crowdsourcing to be more accurate with regards to actual current demand.

In addition, a user has the option of marking text for priority translation. This allows the user to override the normal scoring, or add a boost in the normal scoring (e.g., +50 points), for the sentence/section if there is an urgent need for accurate translation. This can be useful for legal notices or warnings.

The input format submitted for translation by a user is not particularly limited. Thus, a submission can be a document, book, URL, single sentence, etc. The submission can then be parsed into, for example, sentence level and the sentence data can then be tracked/scored. The parts are then translated and put back together for the user. If the sentence has already been translated by a human, then the TM can be accessed for the translation. If a TM translation is not available, then a cached MT can be used or, if a cached MT is not available, then the sentence can be translated by conducting a machine translation.

When a translator logs onto the crowdsourcing user interface, the option of which sentences are available for translation can be based on the weighting of the sentences, as well as other factors such as the expertise of the user or required proficiencies. The human translated sentence is then stored in the TM for future use. Thus, the next time the sentence is submitted for translation, the human translation in the TM can be used.

Figure 2:
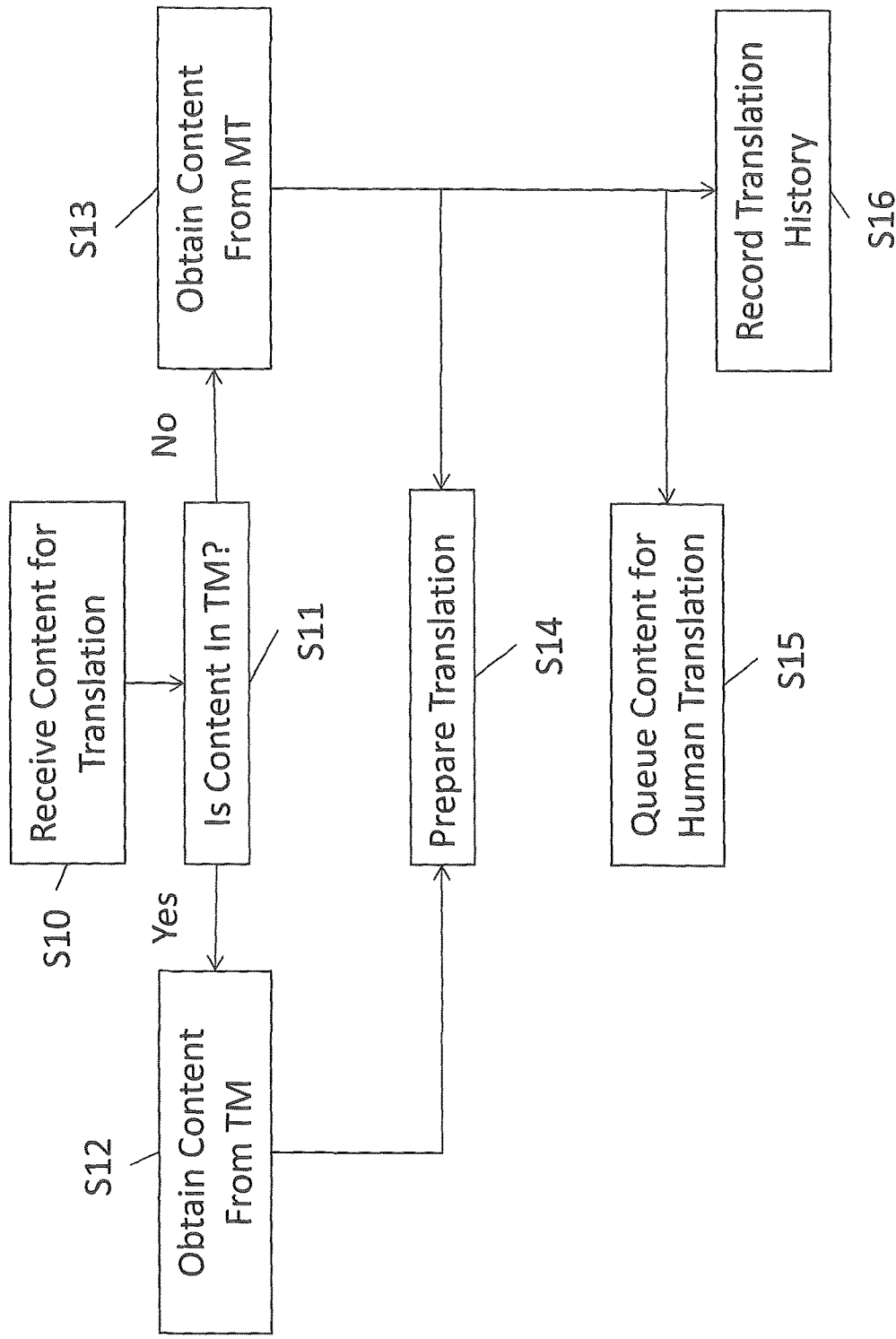
FIG. 2 illustrates an exemplary method of translation.

An exemplary embodiment of the translation system is shown in FIG. 1. An exemplary method of translation is illustrated in FIG. 2. Initially, the content to translate 1 and/or the annotated content 2 to translate are sent to a segmenter 3. After the content is broken into an appropriate segment size by the segmenter 3, for example sentence size, the segmented content is sent to a translator 4 (S10). The translator 4 checks the TM 5 to see if the content has already been translated (e.g., by a human through crowdsourcing or other means) (S11). If so, then the content from the TM can be used as the translation (S12). The translator also can also send the content to the Machine Translation Engine 6 (e.g., MT server) to see if the content is cached as a machine translation or to request a machine translation (S13). This content can also be used for translation if an appropriate human translation is not available. Then, the individual segments can be reassembled by an aggregator to produce the translated content 10 (S14).

Any content for which a human translation was not available can be sent to the crowdsourcing data queue 8 so as to be queued for human translation (S15). The translation history 9 is also recorded and can be used for setting a priority for the content in the crowdsourcing data queue (S16).

An exemplary embodiment of the crowdsourcing system is diagramed in FIG. 3. An exemplary method of crowdsourcing is illustrated in FIG. 4. The crowdsourcing data selector 21 receives input relating to translation history 9, the crowdsourced data 8, user profile information 12 and information entered from the Crowdsourcing UI 13 (S21). The priority of the content is determined based on translation history 9 and any other appropriate variables (S22). A translator may have information stored related to any special skills or accuracy of translation (S23). When the translator accesses the Crowdsourcing UI 13, the translator is given the possible content to translate based on the priority assigned to the content and, optionally, the translator's proficiencies and ratings (S24). The translator may then select content to translate and submit a translation (S25) which can then be added to the TM 5.

In addition, the automated evaluation 14 and User Evaluation UI 15 can both be used to rank users or translations for accuracy, etc. (S26). For instance, the User Evaluation UI 15 can let other users evaluate the quality of a translation. The automated evaluation 14 can, for instance, compare the crowdsourced translation with the machine translation. This information can then be used to score the translator for future reference (S27).

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

The invention claimed is:

1. A method of translating information using crowdsourcing, the method comprising:
    evaluating a metric related to a content to be translated;
    determining a priority for the content based on the metric related to the content;
    queuing the content for the crowdsourcing based on the priority determined from the metric; and
    translating, by a translation server, the information from a language to another language using the crowdsourcing,
    wherein weights attached to the content to determine the priority of the content are constantly updated during a time period based on a current need of the content to be translated by counting a number of times a sentence is submitted for translation in the time period.

2. The method according to claim 1, wherein the metric includes a number of requests for translation during the time period.

3. The method according to claim 2, wherein the time period is based on a predetermined condition.

4. The method according to claim 1, further comprising collecting the metric related to the content to be translated based on a request for translation.

5. The method according to claim 4, wherein the metric includes a date of the request for translation.

6. The method according to claim 1, wherein the metric includes a user entered element.

7. The method according to claim 1, wherein the metric includes a translator expertise requirement.

8. The method according to claim 1, further comprising assigning the content from the queue to a translator based on the priority.

9. The method according to claim 1, further comprising assigning the content from the queue to a translator based on an expertise of the translator.

10. The method according to claim 1, wherein the metric includes a target language.

11. A non-transitory computer-readable medium tangibly embodying a program of machine-readable instructions executable by an apparatus to perform a method of translating information using crowdsourcing, the method comprising:
  evaluating a metric related to a content to be translated;
  determining a priority for the content based on the metric related to the content; and
  queuing the content for crowdsourcing based on the priority determined from the metric; and
  translating, by a translation server, the information from a language to another language using the crowdsourcing,
  wherein weights attached to the content to determine the priority of the content are constantly updated during a time period based on a current need of the content to be translated by counting a number of times a sentence is submitted for translation in the time period.

12. The non-transitory computer-readable medium according to claim 11, wherein the metric includes a number of requests for translation during the time period.

13. The non-transitory computer-readable medium according to claim 11, further comprising collecting the metric related to the content to be translated based on a request for translation.

14. The non-transitory computer-readable medium according to claim 13, wherein the metric includes a date of the request for translation.

15. The non-transitory computer-readable medium according to claim 11, wherein the metric includes a user entered element.

16. The non-transitory computer-readable medium according to claim 11, wherein the metric includes a translator expertise requirement.

17. A translation system, comprising:
  a processor of a computer adapted to receive content to be translated, the processor being configured so as to track a metric related to the content to be translated; and
  a crowdsourcing data selector adapted to receive the content to be translated from the processor and queue the content to be translated based on the metric; and
  a translation server that translates information from a language to another language based on results of crowdsourcing performed by the crowdsourcing data selector,
  wherein weights attached to the content to determine a priority of the content are constantly updated during a time period based on a current need of the content to be translated by counting a number of times a sentence is submitted for translation in the time period.

18. The translation system according to claim 17, further comprising:
  a translation buffer configured to store a human translation of the content to be translated; and
  a crowdsourcing buffer configured to store the content to be translated.

19. The translation system according to claim 18, wherein the crowdsourcing data selector is configured so as to assign the content to be translated based on the metric and characteristic data of the user.

20. The translation system according to claim 18, wherein the processor is configured so as to receive the priority of the content by a user, and
  wherein the metric comprises the priority of the content by the user.

* * * * *